(12) United States Patent
Bordwell et al.

(10) Patent No.: US 10,162,370 B2
(45) Date of Patent: Dec. 25, 2018

(54) PLURAL COMPONENT PROPORTIONING SYSTEM AND METHOD

(71) Applicant: Graco Minnesota Inc., Minneapolis, MN (US)

(72) Inventors: David A. Bordwell, Canton, OH (US); Jonathan R. McMichael, Canton, OH (US); Thomas V. Vo, Bedford, OH (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 14/786,305

(22) PCT Filed: Apr. 28, 2014

(86) PCT No.: PCT/US2014/035664
§ 371 (c)(1),
(2) Date: Oct. 22, 2015

(87) PCT Pub. No.: WO2014/176589
PCT Pub. Date: Oct. 30, 2014

(65) Prior Publication Data
US 2016/0109888 A1 Apr. 21, 2016

Related U.S. Application Data

(60) Provisional application No. 61/816,265, filed on Apr. 26, 2013.

(51) Int. Cl.
*G05D 11/13* (2006.01)
*B05B 7/04* (2006.01)
(Continued)

(52) U.S. Cl.
CPC .............. *G05D 11/132* (2013.01); *B05B 7/04* (2013.01); *B05B 12/1436* (2013.01);
(Continued)

(58) Field of Classification Search
CPC ............ Y10T 137/2499; G05D 11/131; G05D 11/132
See application file for complete search history.

(56) References Cited

U.S. PATENT DOCUMENTS 4,246,230 A 1/1981 Hasselman, Sr.
4,522,789 A * 6/1985 Kelly ..................... B01F 5/102
134/34

(Continued)

FOREIGN PATENT DOCUMENTS

CN 1620639 A 5/2005
CN 101708441 A 5/2010
WO 03071369 A1 8/2003

OTHER PUBLICATIONS

International Search Report and Written Opinion from PCT Application Serial No. PCT/US2014/035664, dated Sep. 22, 2014, 11 pages.

(Continued)

*Primary Examiner* — Kevin Murphy
(74) *Attorney, Agent, or Firm* — Kinney & Lange, P.A.

(57) ABSTRACT

A plural component dispensing system 10 receives separate fluid components, mixes the components in a predetermined ratio, and dispenses the components as mixture. Each fluid component is supplied by a separate pump 12A, 12B to an individual variably controllable fluid regulator 14A, 14B. Each fluid component is supplied from its individual fluid regulator 14A, 14B through a flow meter 18A, 18B to a mixing device 20. The ratio of the components delivered to the mixing device 20 is controlled by the individual fluid regulators 14A, 14B based upon the flow rates measured by the flow meters 18A, 18B.

7 Claims, 2 Drawing Sheets

(51) Int. Cl.
*B05B 12/14* (2006.01)
*B05B 12/00* (2018.01)

(52) U.S. Cl.
CPC .......... *G05D 11/131* (2013.01); *B05B 12/006* (2013.01); *Y10T 137/2499* (2015.04)

(56) References Cited

U.S. PATENT DOCUMENTS

| | | | | |
|---|---|---|---|---|
| 4,964,732 A * | 10/1990 | Cadeo | ............... | B01F 15/00142 |
| | | | | 366/142 |
| 5,257,720 A * | 11/1993 | Wulc | ............... | B67D 7/744 |
| | | | | 222/135 |
| 5,810,254 A | 9/1998 | Kropfield | | |
| 6,220,747 B1 | 4/2001 | Gosselin | | |
| 6,719,921 B2 * | 4/2004 | Steinberger | ............. | B01F 3/088 |
| | | | | 252/186.42 |
| 7,069,944 B2 * | 7/2006 | Morikawa | ............ | G05D 7/0635 |
| | | | | 137/486 |
| 2002/0044494 A1 | 4/2002 | Steinberger et al. | | |
| 2002/0197938 A1 | 12/2002 | Mayes | | |
| 2004/0125688 A1 * | 7/2004 | Kelley | ............... | B01F 5/0077 |
| | | | | 366/152.2 |
| 2004/0165476 A1 | 8/2004 | Millan et al. | | |
| 2005/0058016 A1 * | 3/2005 | Smith | ............... | G05D 11/132 |
| | | | | 366/152.1 |
| 2007/0175511 A1 * | 8/2007 | Doerr | ............... | G05D 11/132 |
| | | | | 137/6 |
| 2008/0061079 A1 | 3/2008 | Hedger | | |
| 2009/0154288 A1 * | 6/2009 | Heathman | ............... | B01F 5/102 |
| | | | | 366/142 |

OTHER PUBLICATIONS

First Chinese Office Action for Chinese Patent Application No. 201480022820.9, dated Jan. 3, 2017, 14 pages.
Extended European Search Report, for European Patent Application No. 14787927.4, dated Jan. 3, 2017, 8 pages.
Second Chinese Office Action for Chinese Patent Application No. 201480022820.9, dated Aug. 15, 2017, 14 pages.
Third Chinese Office Action for Chinese Patent Application No. 201480022820.9, dated Dec. 1, 2017, 17 pages.

* cited by examiner

PLURAL COMPONENT PROPORTIONING SYSTEM AND METHOD

CROSS-REFERENCE TO RELATED APPLICATION(S)

This application claims priority from U.S. Provisional Application Ser. No. 61/816,265, filed Apr. 26, 2013, entitled PLURAL COMPONENT PROPORTIONER AND REGULATOR, which is incorporated by reference.

BACKGROUND

The present invention relates to plural component dispensing systems, and more particularly to a system to take multiple material components and proportion them accurately to a specified mixed ratio.

Fluid proportioners comprise dispensing systems that receive separate inert fluid components, mix the components in a predetermined ratio and then dispense the components as an activated compound. For example, fluid proportioners are used to dispense epoxies and polyurethanes that solidify after mixing of a resin component and an activating material, which are individually inert. However, after mixing an immediate chemical reaction begins taking place that results in the cross-linking, curing, and solidification of the mixture. Therefore, the two components are routed separately into the proportioner so that they can remain segregated as long as possible. A manifold receives each component after it is pumped separately and mixes the components so the mixture can be dispensed from a sprayer coupled to the manifold.

A typical fluid proportioner comprises a pair of positive displacement pumps that individually draw in fluid from separate fluid hoppers and pump pressurized fluids to the mix manifold. The pumps are driven in synchronicity by a common motor, typically an air motor or hydraulic motor, having a reciprocating drive shaft. Such configurations are simple and easy to design when the fluid components are dispensed in a 1:1 ratio and the pumps are of equal volumetric displacement. Force balancing in these configurations can be adequately accommodated by placing the motor halfway between the pumps. As such, forces generated between the pumps and the motor are equal.

Most two component epoxies and polyurethanes are not, however, comprised of a 1:1 ratio of the components. Typically a first major component is needed in a higher concentration than a second minor component.

SUMMARY

A system for providing a mixture produced from separate fluid components includes a plurality of positive displacement pumps, a plurality of fluid regulators, a plurality of flow meters, a receiving device, and a control system. Each pump delivers a separate fluid component, and each fluid regulator is connected to one of the pumps for regulating fluid pressure of one of the fluid components. Each flow meter is connected to one of the fluid regulators for sensing flow rate of one of the fluid components. The receiving device receives the separate fluid components. The control system controls the fluid regulators based on the measured flow rates to produce a desired mix ratio of the separate fluid components.

The method of producing a mixture based upon separate fluids includes pumping a plurality of separate fluids, sensing flow rate of each of the separate fluids, delivering the separate fluids to a receiving device, and individually regulating fluid pressure of each of the separate fluids as a function of flow rate sensed to produce a desired ratio of the separate fluids at the receiving device.

DETAILED DESCRIPTION

Figure 1:
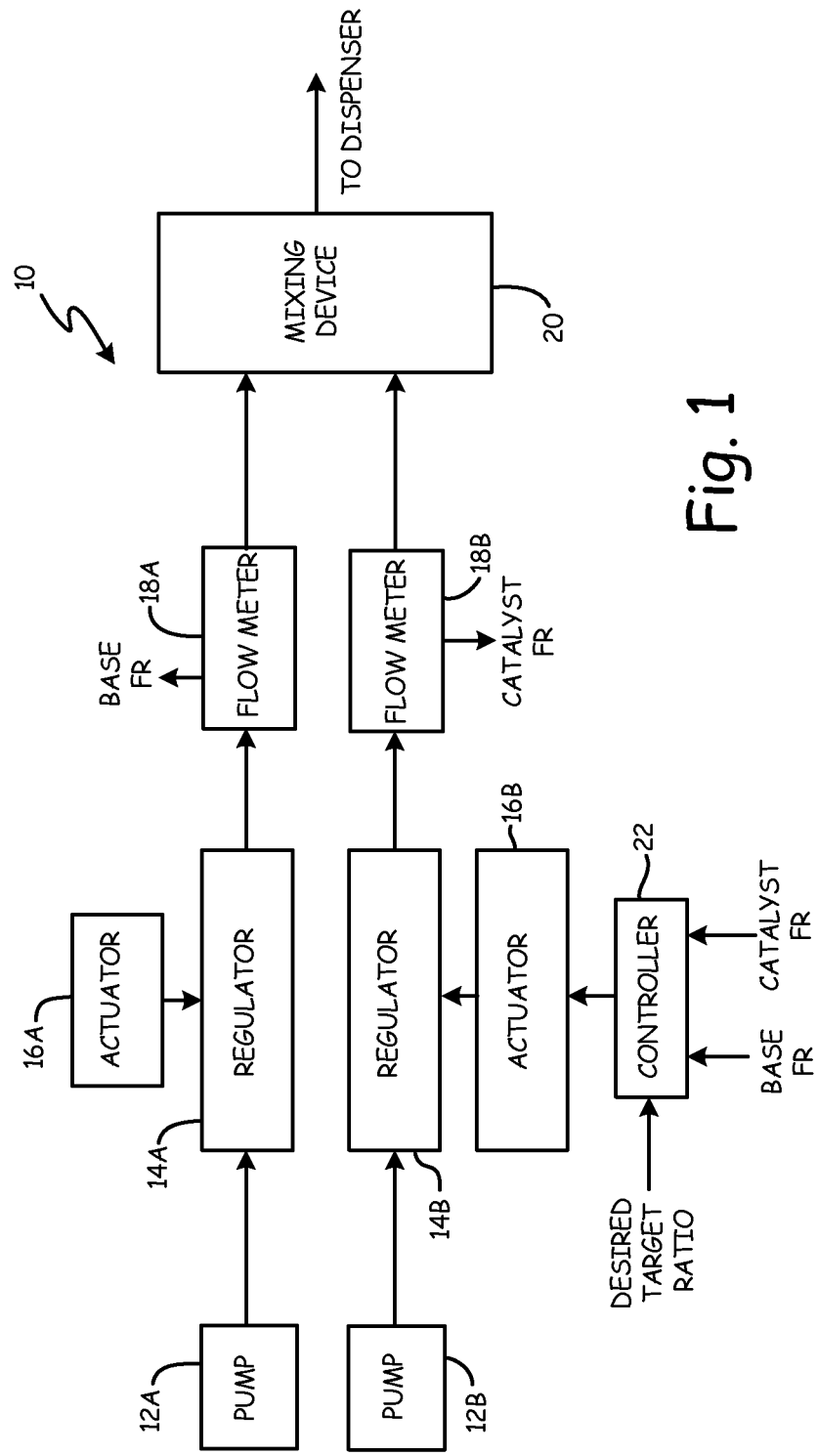
FIG. 1 is a block diagram of a two component fluid proportioning system with independent variable fluid regulators and individual flow meters.

FIG. 1 is a block diagram of fluid proportioning system 10, which may be used, for example, in a multicomponent spray system. In the particular embodiment shown in FIG. 1, system 10 is designed for a two component mix application in which two separate inert fluid components are mixed in a predetermined ratio and then dispensed as an activated compound. The two components will be referred to as the base fluid component and the catalyst fluid component.

FIG. 1 includes base pump 12A and catalyst pump 12B, base fluid regulator 14A and catalyst fluid regulator 14B, base actuator 16A and catalyst actuator 16B, base flow meter 18A and catalyst flow meter 18B, mixing device 20, and controller 22. Base fluid material is pumped under pressure by base pump 12A to base fluid regulator 14A, which regulates the fluid pressure of the base material in response to base actuator 16A. The base material flows from base fluid regulator 14A through base flow meter 18A to mixing device 20. Base flow meter 18A senses the flow rate of the base material as it flows to mixing device 20.

The catalyst fluid component is pumped under pressure by catalyst pump 12B to catalyst fluid regulator 14B. The fluid pressure of the catalyst fluid component is regulated by catalyst fluid regulator 14B under the control of actuator 16B. The catalyst fluid component is delivered from catalyst fluid regulator 14B through catalyst flow meter 18B to mixing device 20.

At mixing device 20, the base and catalyst components are mixed, which produces an immediate chemical reaction. The reacted mixture is delivered by the mixing device 20 to a dispenser (not shown).

Depending on the base and catalyst materials being used, the mix ratio between the base and catalyst materials can vary significantly. Often the base material is the major component and is required at a much higher concentration than the catalyst component. In system 10, base fluid regulator 14A and catalyst fluid regulator 14B are controlled by actuators 16A and 16B to produce the desired mix ratio for the particular base and catalyst materials being used. The control of the mix ratio is based upon the sensed flow rates of the base and catalyst materials produced by base flow meter 18A and catalyst flow meter 18B, respectively.

In one embodiment, base fluid regulator 14A and catalyst fluid regulator 14B are air controlled fluid regulators. Actuators 16A and 16B provide air pressure to regulators 14A and 14B, respectively, in order to set the regulated fluid pressure of the base and catalyst materials, respectively. In one embodiment, actuator 16A is a manually set air regulator, and is capable of producing a variable air pressure of between 0 and 85 psi. Actuator 16B is an electrically controlled air regulator that can vary air pressure from 0 to 85 psi based upon a variable electrical control signal from controller 22. The control signal, for example, may be a variable voltage of between 0 and 10 volts.

In the embodiment in which actuator 16A is a manual air regulator and actuator 16B is an electrically controlled air regulator, an operator will set manual air regulator 16A to produce a desired regulated fluid pressure at the output of regulator 16A. With that regulated fluid pressure, a flow rate of base material from regulator 14A to mixing device 20 is established and is measured by base flow meter 18A. Catalyst fluid regulator 14B is controlled by controller 22 through actuator 16B so that the flow rate of catalyst material is scaled to the flow rate of the base material. The scaling factor used is based upon a desired target ratio of base to catalyst needed by mixing device 20 to produce the desired mix of reacted fluid. Controller 22 may receive feedback signals from base flow meter 18A and catalyst flow meter 18B in order to provide a control signal to actuator 16B that will result in a regulated fluid pressure at the output of regulator 16B that results in a catalyst flow rate that will produce the desired target ratio. Alternatively, an operator may read the flow rates produced by the base and catalyst flow meters 18A and 18B and provide a control input to controller 22.

In system 10, the catalyst flow rate tracks the base flow rate. As a result, the overall flow rate of material supplied by mixing device 20 is dictated by adjustment of base actuator 16A, which may be a manual air regulator adjusted by the operator. In that case, the operator would adjust actuator 16A manually until a desired base flow rate is measured by flow meter 18A and would supply an input indicating the desired target ratio to controller 22.

System 10 provides a number of advantages. System 10 is not concerned with the supply system that is feeding it base and catalyst material. The operation of pumps 12A and 12B do not need to be synchronized, and can have different pump output pressures. Regulators 14A and 14B act as accumulators to dampen out material pressure variations and disturbances that can occur, for example, during a pump change-over or during air supply changes.

Although system 10 has been described as implemented using variable air pressure regulators, the regulators can alternatively be controlled electrically or hydraulically.

Using feedback from flow meters 18A and 18B, system 10 can maintain the desired target ratio using regulation of fluid pressure by regulators 14A and 14B. By using separate regulators and flow meters for each individual material, proper ratio regulation can be achieved.

In the preferred embodiment, the predominant material (often referred to as the "resin" or "base" or "A" material) is regulated to a fixed flow by setting the associated fluid regulator to a fixed setting. Both materials are supplied under pressure by simple supply pumps at pressures (e.g. 5000 psi) substantially above the level at which they will be dispensed. The regulator on the A side regulates the fluid pressure down to that level (e.g. 2000 psi) which will produce the desired flow. The controller then looks at the flow produced on the A side and regulates the fluid regulator on the B side to produce the desired flow on that side commensurate with the ratio required by the material being used.

For example, materials may have ratios between the A and B sides of anywhere from 1:1 to 10:1 or even more. In this example, it is desired to regulate the B side to a similar pressure as the A side to assure the desired ratio is maintained. By regulating controlled flow through the flow meters to a pressure level substantially below that produced by the supply pumps, pressure variations due to changeover or other factors are effectively eliminated.

Figure 2:
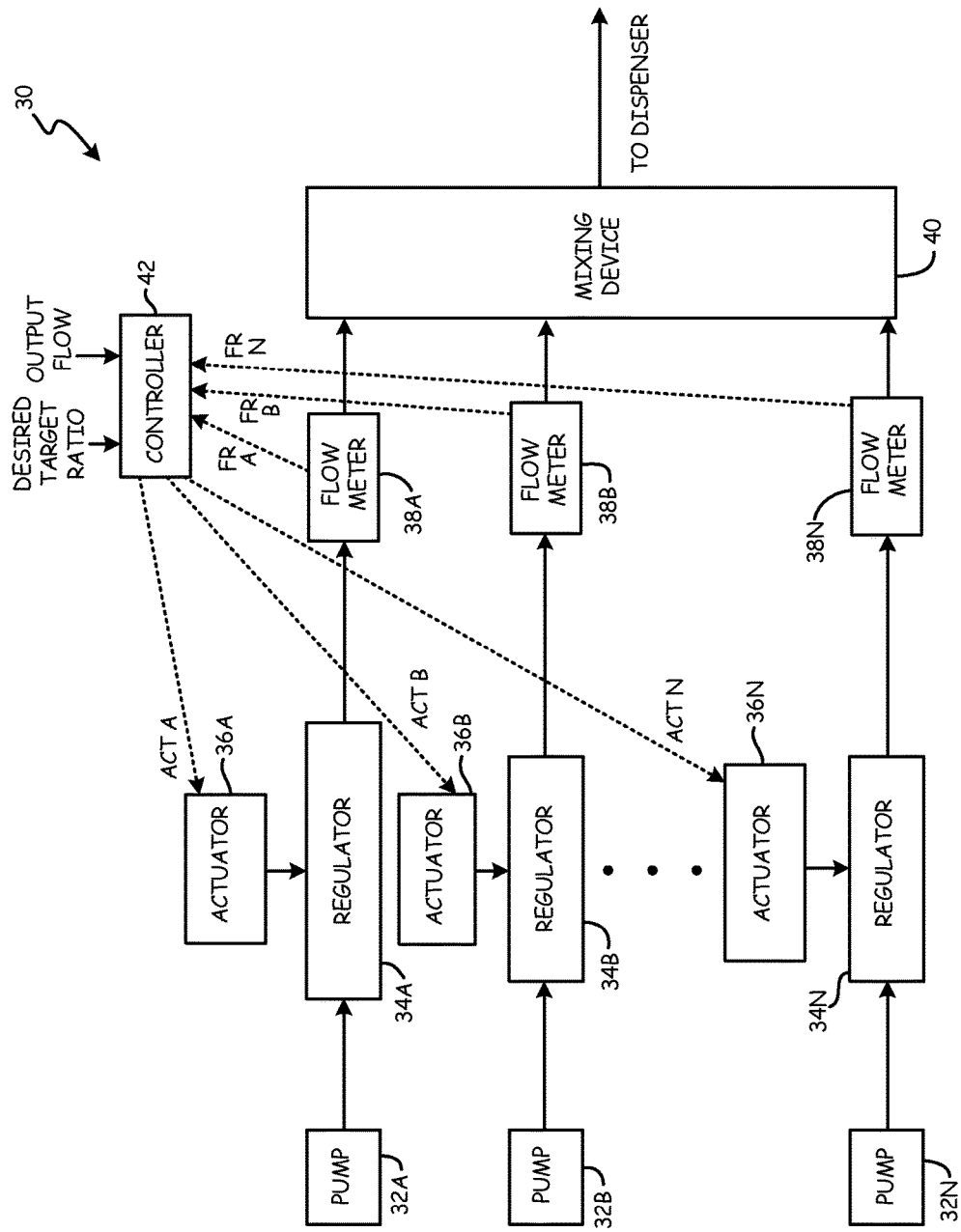
FIG. 2 is a block diagram of a multiple material mix system for treating a plurality of fluid materials delivered from individual pumps through variable controlled fluid regulators and flow meters to a mixing device.

FIG. 2 shows system 30, which is an N component mixing system in which N individual fluid components are mixed. System 30 includes pumps 32A-32N, fluid regulators 34A-34N, actuators 36A-36N, flow meters 38A-38N, mixing device 40, and controller 42.

In system 30, each individual component (which may be referred to as components A through N) is delivered separately to mixing device 40. For example, component A is delivered at high pressure from positive displacement pump 32A to fluid regulator 34A. The output of regulator 34A is a variable regulated fluid pressure. Component A is supplied from regulator 34A through flow meter 38A to mixing device 40. The regulated fluid pressure is determined by an actuating signal, which may be electrical or mechanical from actuator 36A to regulator 34A. Flow meter 38A provides a flow rate signal FRA representing measured flow rate of component A to controller 42. Actuator 36A is responsive to actuator control signal ACTA from controller 42.

Similarly, component B is supplied from pump 32B to mixing device 40 through regulator 34B and flow meter 38B. Actuator 36B controls the variable fluid pressure provided by regulator 34B based upon an actuator control signal ACT B from controller 42. Flow meter 38B provides measured flow rate signal FRB to controller 42.

Component N is supplied under pressure from the positive displacement pump 32N to regulator 34N, which is controlled by actuator 36N. Component N flows through flow meter 38N to mixing device 40. Flow rate signal FRN is supplied by flow meter 38N to controller 42.

Controller 42 supplies actuator control signals ACTA-ACTN to actuators 36A-36N based upon desired target ratio input information and flow rate feedback signals FRA-FRN received from flow meters 38A-38N, respectively.

System 30 individually controls the regulated fluid pressure and thus the flow rate of each of the components in order to establish and maintain the desired target ratio of the components that are mixed in mixing device 40. In addition, controller 42 can control the flow rates of all of the components individually so that the desired output flow of the mixture to the dispenser is maintained.

The flow meters used with this invention may measure flow directly or indirectly. Examples of flow meters using direct measurement include typical industry flow meters such as gear meters and coriolis mass flow meters. Indirect measurement can be achieved, for example, by measuring position displacement of a pump and finding correlations to provide a flow measurement.

The fluid regulators can take a variety of forms. For example, the fluid regulators may regulate flow by controlling a variable orifice. A larger orifice provides less pressure drop, while a smaller orifice provides more pressure drop. Another type of flow regulator includes an on/off valve, with the flow being regulated by how long the valve stays open.

The invention can also be used without including a mixer for some applications. An example is a method and system for filling separate cartridges to a specific ratio. Each cartridge (rather than a mixer) is the receiving device for receiving the separate components.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
a plurality of positive displacement pumps, each pump for delivering a separate fluid component;
a plurality of fluid regulators, each fluid regulator connected to one of the pumps for regulating fluid pressure of one of the fluid components;
a plurality of flow meters, each flow meter for measuring flow rate of one of the fluid components;
a device for receiving and mixing the separate fluid components to produce a mixture so that an immediate chemical reaction begins taking place; and
a control system that includes a plurality of actuators, each actuator controlling one of the fluid regulators, each actuator providing variable air pressure to the fluid regulator that it controls to produce a regulated fluid pressure at an output of the fluid regulator that is a function of the variable air pressure, wherein only one of the plurality of actuators is manually adjustable to set the regulated fluid pressure of the one actuator and a remainder of the plurality of actuators are responsive to the control system to control respective regulated fluid pressures based on respective sensed flow rates and thereby produce a desired ratio of the separate fluid components.

2. The system of claim 1, wherein the fluid components include a base component and a catalyst component.

3. The system of claim 1, wherein the control system includes a controller that controls each of the remainder of the plurality of actuators based on a desired target ratio input and at least one sensed flow rate.

4. A method comprising:
individually pumping a plurality of separate inert fluids;
individually measuring flow rate of each of the separate inert fluids;
delivering the separate inert fluids to a receiving device;
individually regulating fluid pressure of each of the separate inert fluids to produce a desired target ratio of the separate inert fluids delivered to the receiving device;
mixing the separate inert fluids at the receiving device to produce a mixture and so that an immediate chemical reaction begins taking place; and
delivering the mixture to a dispenser;
wherein individually regulating the fluid pressure of each of the separate inert fluids comprises providing, for each separate inert fluid, variable air pressure to a fluid regulator that regulates fluid pressure of that fluid to produce a regulated fluid pressure for that fluid at an output of the fluid regulator that is a function of the variable air pressure, and wherein providing a variable air pressure of each fluid regulator comprises providing a manually set air pressure to only one of the fluid regulators and providing respective air pressures to each remaining fluid regulator that is responsive to a controller.

5. The method of claim 4, wherein the separate fluids include a base component and a catalyst component.

6. A fluid mixing system comprising:
a first pump for delivering a pressurized first fluid;
a second pump for delivering a pressurized second fluid;
a first fluid regulator for regulating fluid pressure of the first fluid;
a second fluid regulator for regulating fluid pressure of the second fluid;
a first flow meter for measuring flow rate of the first fluid;
a second flow meter for measuring flow rate of the second fluid;
a mixing device for receiving and mixing the first fluid and the second fluid to produce a mixture, based on a mix ratio of the first fluid and second fluid, so that an immediate chemical reaction begins taking place;
a controller that causes the second fluid regulator to regulate the fluid pressure of the second fluid so that the flow rate of the second fluid is scaled to the measured flow rate of the first fluid to produce the mix ratio;
a first actuator for supplying a first pressure to the first fluid regulator to produce a first regulated fluid pressure at an output of the first fluid regulator that is a function of the first pressure, wherein the first regulated fluid pressure is manually adjustable via the first actuator, the first regulated fluid pressure being the only manually adjustable regulated fluid pressure; and
a second actuator, responsive to the controller, for supplying a second control pressure to the second fluid regulator to produce a second regulated fluid pressure at an output of the second fluid regulator, wherein the second actuator is responsive to the controller.

7. The system of claim 6, wherein the first fluid is a base component and the second fluid is a catalyst component.

* * * * *